US012679042B2

(12) United States Patent
Draht et al.

(10) Patent No.: US 12,679,042 B2
(45) Date of Patent: Jul. 14, 2026

(54) ADDITIVELY MANUFACTURED COMPONENT OUT OF METAL OR PLASTIC MATERIAL WITH A STANDARD THREAD

(71) Applicant: BÖLLHOFF VERBINDUNGSTECHNIK GmbH, Bielefeld (DE)

(72) Inventors: Torsten Draht, Schloß Holte-Stukenbrock (DE); Michael Brand, Bad Driburg (DE); Jörg Moehring, Paderborn (DE); Franz Ferdinand Menne, Bad Lippspringe (DE); Thorben Schiemann, Nienstädt (DE); Rami Hasso, Gütersloh (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 206 days.

(21) Appl. No.: 18/067,778

(22) Filed: Dec. 19, 2022

(65) Prior Publication Data

US 2023/0191715 A1 Jun. 22, 2023

(30) Foreign Application Priority Data

Dec. 22, 2021 (EP) .................................... 21217088

(51) Int. Cl.
| | |
|---|---|
| *B33Y 80/00* | (2015.01) |
| *B29C 64/10* | (2017.01) |

(Continued)

(52) U.S. Cl.
CPC ............ *B29C 65/608* (2013.01); *B29C 64/10* (2017.08); *B33Y 80/00* (2014.12); *F16B 19/1072* (2013.01); *F16B 2019/1009* (2013.01)

(58) Field of Classification Search
CPC ....... B25B 27/143; B29C 64/00; B29C 64/10; B29C 64/141; B29C 64/153;
(Continued)

(56) References Cited

U.S. PATENT DOCUMENTS

| | | |
|---|---|---|
| 5,893,245 A | 4/1999 | Sekiguchi et al. |
| 10,662,992 B2 | 5/2020 | Germann et al. |

(Continued)

FOREIGN PATENT DOCUMENTS

| | | | |
|---|---|---|---|
| CN | 101530919 A | | 9/2009 |
| CN | 112490719 A | * | 3/2021 |

(Continued)

OTHER PUBLICATIONS

CN Office Action for CN Application No. 202211659447.0 dated Jul. 15, 2025 (6 pages).

(Continued)

*Primary Examiner* — Michael A Tolin
(74) *Attorney, Agent, or Firm* — Reising Ethington P.C.

(57) ABSTRACT

A component bond out of an additively manufactured component out of metal or plastic material having an inner receiving space that is open on at least one side on a component opening, which is accessible from a component side and is configured fungiform in an axial cross section. The receiving space includes at least one widened molding section facing the component opening and at least one cylinder shaped support section facing away from the component opening, wherein a blind rivet nut or a blind rivet bolt are fastened in the receiving space by a compression bead of the blind rivet nut or of the blind rivet bolt extending into the molding section.

7 Claims, 7 Drawing Sheets

(51) Int. Cl.
    *B29C 65/60*         (2006.01)
    *F16B 19/10*         (2006.01)

(58) Field of Classification Search
    CPC ... B29C 64/165; B33Y 80/00; F16B 19/1036;
                  F16B 19/1045; F16B 19/1072; F16B
                  2019/1009; F16B 29/00; F16B 35/04;
                  F16B 35/041; F16B 35/048; F16B 35/06;
                  F16B 37/062; F16B 37/065; F16B
                  37/067; F16B 37/12; F16B 37/122; F16B
                  37/125; F16B 37/127; F16B 2037/007;
                  Y02P 10/25
    See application file for complete search history.

(56)             References Cited

U.S. PATENT DOCUMENTS

2018/0038406 A1*   2/2018   Makino ................. F16B 37/067
2018/0363691 A1*   12/2018   Gunner .................. B22F 10/28
2019/0016567 A1*   1/2019   Losange ................. B22F 10/28
2020/0316873 A1   10/2020   Mayer et al.

FOREIGN PATENT DOCUMENTS

| | | |
|---|---|---|
| DE | 1625359 A1 | 6/1970 |
| EP | 3045739 A1 | 7/2016 |
| EP | 3434916 A1 | 1/2019 |
| EP | 3584454 A2 | 12/2019 |
| EP | 3915763 A1 | 12/2021 |
| GB | 1182739 A | 3/1970 |
| GB | 2461866 A | 1/2010 |

OTHER PUBLICATIONS

CN Office Action for CN Application No. 202211659447.0 dated Feb. 4, 2026 (11 pages).

* cited by examiner

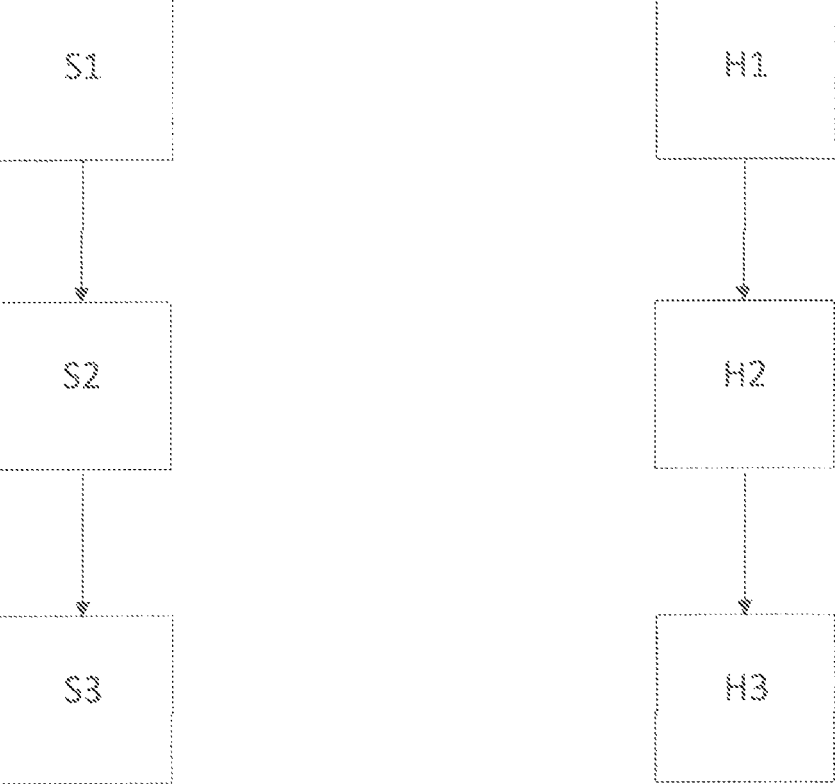
Fig. 13                                                     Fig. 14

ADDITIVELY MANUFACTURED COMPONENT OUT OF METAL OR PLASTIC MATERIAL WITH A STANDARD THREAD

CROSS REFERENCE TO RELATED APPLICATIONS

This application claims the priority to EP Patent Application No. EP21217088.0 filed on Dec. 22, 2021, and the content of this priority application is incorporated herein by reference in its entirety.

TECHNICAL FIELD

The present disclosure is related to an additively manufactured component out of metal or plastic material which is adapted to receive a blind rivet nut or a similar thread element for providing a thread that is true to gauge, which may be a standard thread. Furthermore, the present disclosure relates to a component bond consisting of the additively manufactured component and a blind rivet nut or a blind rivet bolt or a thread sleeve for providing a true-to-gauge thread, which may be a standard thread, in the additively manufactured component. Furthermore, the present disclosure relates to an additive manufacturing method of a component which is capable of receiving one of the above-mentioned thread elements as well as to a manufacturing method of an additively manufactured component with a true-to-gauge thread, which may be a standard thread, in which one of the above thread elements is fixedly arranged in the additively manufactured component.

BACKGROUND

Additively manufactured components out of plastic material or metal are becoming more and more attractive in practice due to the increasing freedom in design. However, directly additively manufactured threads are a disadvantage of these components. Such threads usually need post-processing so as to be able to provide a standardized thread in the respective component, i.e. a thread corresponding to known standards, such as DIN norms and the like, with the thread being true to gauge. Because due to the process-caused manufacturing tolerances in the additive manufacturing of components, standardized threads could so far not be realized.

Another option would be to subsequently generate threads in an additively manufactured component by machining processing steps. However, in case the material of the additively manufactured component is a material that is difficult to machine, as for example nickel based alloys or titanium, the generating of threads is often connected to a tremendous additional effort.

In case components are manufactured directly, i.e. without using additive methods, sensitive sectors such as medical technology and aerospace technology still have reservations. Because in the conventional manufacturing of threads in components, coolants and lubricants are used which can only be cleaned from the manufactured components with high instrumental and timely effort. The same applies to the present chips, provided that machining methods were used in the manufacturing of threads.

Therefore, the manufacturing of additive components with threads becomes increasingly significant for these sensitive sectors, too.

The European patent application EP 3 434 916 A1 describes the additive manufacturing of a component with a retention device for a thread element. This retention device is for example formed in the shape of a claw which is anchored in the additively manufactured component. A thread element of different dimensions is releasably fastenable in this claw in order to provide the additively manufactured component with a thread. However, this kind of construction has the disadvantage that first of all, an auxiliary component, in this case the above-mentioned claw, must be anchored in the additively manufactured component. Only after that is it possible to connect the necessary thread element with the component. This plurality of constructional steps as well as the releasability of the thread element from the additively manufactured component brings along different problems in practice.

The Chinese patent application CN 101 530 919 A describes the manufacturing of an additively manufactured component out of metal powder and a binder. For providing an inner thread in the component, a thread sleeve is cast into the binder solution so that a green body with thread sleeve is formed. Subsequently, the binder is burnt out from the green body and the metal powder is cured in order to provide a finished component with thread sleeve. This manufacturing method has the disadvantage that the interconnecting or fastening of the thread sleeve in the green body to be burnt out during the manufacturing of the green body as well as during the later component manufacturing must be guaranteed. The structural and chemical requirements which are necessary for that are not trivial for being able to effectively guarantee a sufficient pull-out resistance of the thread sleeve from the manufactured additive component.

In the European patent application EP 3 584 454 A2, a retaining ring with a moveable nut element arranged in there is manufactured. The advantage of this arrangement is that the angular orientation of the nut element can be changed in an extensively circumferential retaining groove of the ring so as to be able to establish a connection to a thread bolt in different orientations. With respect to the additive manufacturing of the nut element, the question however remains open which quality the inner thread of the nut element has. As in this additive manufacturing method, too, the same tolerances apply when manufacturing a thread, it is to be assumed that the disclosed thread needs reworking by suitable post processing steps in order to be able to establish a suitable connection to a thread bolt with a standard thread. Therefore, this document neither provides a reliable possibility for equipping an additively manufactured component with a thread element.

It is therefore the object of at least some implementations of the present disclosure to provide an additively manufactured component with a standardized thread in order to be able to reliably connect the component.

SUMMARY

The above object is solved by means of an additively manufactured component out of metal or plastic material, by a component bond out of an additively manufactured component and a thread element, by an additive manufacturing method for a component as well as by a manufacturing method for an additive component with a standard thread. Advantageous embodiments and further developments arise from the following description, the accompanying drawings as well as the appending claims.

The present disclosure includes an additively manufactured component out of metal or plastic material having an inner receiving space that is open on at least one side at a component opening, which is accessible from a component side and is configured fungiform in an axial cross section, wherein the receiving space includes at least one widened molding section facing the component opening and at least one cylinder shaped support section facing away from the component opening, which may be a radially widened molding section with respect to the cylinder shaped support section.

The present disclosure includes an additively manufactured component which is equipped with a true-to-gauge resilient thread, which may be with a standard thread. In order to achieve this goal, thus providing a solution for the above object, the present disclosure includes a hybrid component consisting of a component that is manufactured with the help of an additive manufacturing method, in which a known blind rivet nut, a blind rived bolt, a thread sleeve or a similar, known element with a true-to-gauge thread is arranged. The prerequisite for such a component bond as is described below in more detail is first of all an additively manufactured component which consists of plastic material or of metal.

Additive manufacturing methods are generally known in the state of the art. Accordingly, components are constructed in layers with the help of plastic granules, with which more complex constructions can be realized than compared to with for example the help of injection molding or machining methods. In the same way, it is also possible to process metal powders in an additive manufacturing method to form a component. The prerequisite for such known additive manufacturing methods is a three-dimensional component construction which is converted into a layer model computer-aided. Subsequently, the actual component is then constructed in layers with the help of the layer model.

In order to be able to equip the additive component with a thread element that is true to gauge, a receiving space that is fungiform in its cross section is provided in the additively manufactured component. This receiving space is accessible via a component opening in the component surface of the component. Accordingly, it is possible that the true-to-gauge thread element be inserted into the fungiform component opening via the component opening. The fungiform cross section arises due to the combination of a widened molding section which faces the component opening. A cylindrical receiving or support section is attached to this widened molding section. Therefore, the molding section may be widened in radial direction with respect to a central longitudinal axis of the component and in addition in comparison with a radial expansion of the support section. The target of these two sections can be explained based on the exemplary receiving of a blind rivet nut, because a blind rivet nut provides its inner thread in a cylindrical section which is received at least partly by the cylindrical support section of the additively manufactured component.

In order to fasten the blind rived nut in the known way to a sheet component, an axial compression of the blind rivet nut takes place. This compression then leads to a radial compression bead or a radially outwardly extending folding of a shaft portion, which may extend radially beyond the outer side of the cylindrical support section.

In order to be able to fasten a blind rivet nut in the additively manufactured component, the widened molding section is provided, because during the compressing fastening of the blind rivet nut or the blind rivet bolt or a thread sleeve with compression section, the compression bead or folding deforms in the molding section of the additive component and is received in there. Thus, the additively manufactured component provides a fungiform receiving space for positioning, fastening and coupling between the additively manufactured component and the thread element.

In order to provide the receiving space for the compression bead or folding, the design of the form of the molding section is freely designable as long as the molding portion extends radially beyond the support section. According to different embodiments, the expanded molding section may be configured bead-like or torus-like or polyhedron-like or ellipsoid or triangular, quadrangular or pentagonal or cylindrical or like a truncated cone in order to be able to receive the necessary receiving volume for the compression portion of the thread element.

This is due to the fact that the widened molding section does not only provide the necessary deformation space for the exemplary used blind rivet nut or the blind rivet bolt. Rather, the widened molding section may also serve for establishing a form fit between the additively manufactured component and the compressingly deformed thread element. Furthermore, the connection between compressingly deformed thread element and the additively manufactured component may lead to a press fit, which may guarantee a position securing of the thread element in the additively manufactured component. Such a position securing has the advantage that the thread element may be held tight against rotation about its longitudinal axis. It is a further target to guarantee an axial position of the thread element within the component. That means that the thread element cannot be offset in the direction of its longitudinal axis.

According to the disclosure, a diameter of the molding section of the additively manufactured component is larger than a diameter of the support section.

As is known from the use of compressed thread elements, as for example a blind rivet nut or a blind rivet bolt, the formed compression bead extends in radial direction beyond a radial outside of a thread section. In adaption to this shape, the diameter of the widened molding section was formed larger than the diameter of the support section according to a configuration of the present disclosure. By that, the necessary inner cavity is provided in which the set, compressed thread element is supposed to be received. Beside the necessary space for receiving the compression bead of the thread element to be compressed, the widened molding section which is configured larger in radial direction also serves for the supporting of a forming undercut between the additively manufactured component and the compressed thread element compared to the support section. Because due to the molding of the compression bead into the widened molding section, the compression bead of the thread element in combination with the expanded molding section form an undercut in axial direction of the thread element. This supports the pull-out resistance and an axial positioning of the thread element in addition to the mechanical fastening of the thread element to be compressed in the additively manufactured component.

According to a further configuration, the support section of the additively manufactured component comprises a circumferential inner wall which may be circumferentially structured by means of a diameter variation of the support section, which may be in a rotation inhibitive way.

According to another configuration, the molding section of the additively manufactured component includes a circumferential inner wall which may be circumferentially structured by means of a diameter variation of the molding section.

In order to achieve a rotation-inhibitive press fit of the thread element between component and thread element in the additively manufactured component in addition to a press fit of the compressed thread element, the radially inner circumferential inner wall of the cylindrical support section and/or molding section may be configured in a structured way. In this context, structure means that an inner diameter of the molding section and/or the support section is varied such in terms of its size with a rotation of 360° within the respective section that in case of a suitable molding of a section of the outer side of the compressed thread element, a form fit between the additively manufactured component and the thread element arises. The result of this form fit is that the thread element may be fixedly retained in the additively manufactured component against a rotation about its longitudinal axis with the help of this form fit. Such a form fit may for example be achieved by means of radial steps, angular or web-like protrusions at the radial inner side of the molding section or of the support section, by means of projecting blocking webs or blocking knobs or the like.

According to the disclosure, the relation of a diameter $D_1$ of the molding section with respect to a diameter $D_2$ of the support section is $0.6 \leq D_2/D_1 \leq 0.95$.

For the adaption of the fungiform receiving space to the thread element to be received and to be compressed, the molding section may be equipped with a larger diameter compared to the cylindrical support section. The relations which may be in this context between the diameters of molding section and support section provide for a sufficient undercut in axial direction which may guarantee the pull-out resistance of the compressed thread element out of the additively manufactured component.

According to a further embodiment of the additively manufactured component, the molding section may have an axial extension $h_E$ in a range from 0.5 mm $\leq h_E \leq$ 10 mm, or 0.5 mm $\leq h_E \leq$ 5 mm.

According to a further configuration of the additively manufactured component with receiving space for the thread element to be compressed, the widened molding section may be limited to a portion with regard to its axial extension. This axial portion may guarantee a fitting being as tight as possible of the compression bead of the compressed thread element into the widened molding section. In this way, an axial play between the compression bead of the thread element and the axial extension of the molding section in axial direction of the thread element may be limited to a minimum. An advantage of this is that during the compressing molding-in of the thread element, as for example of the blind rivet nut, a number of touching limiting surfaces between the thread element and the additively manufactured component arise. These limiting surfaces which may abut one another support a transmission of mechanical loads between the thread element and the component, causing a reduction of the mechanical individual loading of both parts of the component bond.

According to a further configuration, a circumferential collar which projects radially to the inside may be arranged between the component opening and the molding section, the collar serving as an axial clamping portion with an axial thickness $h_K$ in a range from 0.5 mm $\leq h_K \leq$ 5 mm.

According to different configurations of thread elements to be compressed, such as for example a blind rivet nut or a blind rivet bolt, the same include a circumferential collar. This collar serves for the compressing thread element to rest upon the component surface after being inserted into a component opening. The advantage of this is that a defined axial position of the thread element to be compressed can be achieved within the additively manufactured component. In addition, this collar has the advantage that it provides an abutment surface so that in addition to the undercut formed by the compression bead, the collar also forms an axial undercut. This collar may allow a screw connection on block via the collar against the thread element in order to mechanically relieve the additively manufactured component.

In order to support this positioning and the retention of the thread element to be compressed within the additively manufactured component, a circumferential collar projecting radially inwardly is provided which abuts the receiving space of the additively manufactured component. This collar which projects radially inwardly may provide two abutment faces being opposite to one another for the compression bead and the radial collar of the compressed thread element. With the help of an axial thickness of the radially inwardly projecting collar, it may be guaranteed that a press fit between the compressed thread element and the component is achieved. This is due to the fact that according to a configuration of the present disclosure, the radially inwardly projecting collar of the additively manufactured component is held friction-fit between the compression bead and the collar of the thread element in a press fit due to the compression of the thread element.

Furthermore, the present disclosure comprises the embodiment in which an axial step may be arranged between the component surface and the molding section, the axial step may include a non-round radial contour.

According to an adaptation of the additively manufactured component to the accommodation of a thread sleeve with compression portion being formed axially on one side, an axial step may be provided at the additively manufactured component. This axial step may encompass the component opening, which leads into the receiving space of the additively manufactured component. Furthermore, the axial step may constitute an axial depression in the component surface adjacent to the component opening.

A circumferential collar of, for example, a thread sleeve to be received is receivable in this depression. According to a further configuration, the axial step may guarantee that the thread sleeve is received flush in the additively manufactured component. Thus, no axial section of the thread sleeve projects beyond the component surface of the additively manufactured component.

According to a further configuration, the axial step may be used for establishing a form fit between a collar of the thread sleeve and a radial inner side of the axial step, because during the molding-in of the thread sleeve into the axial step, more precisely of the radial collar of the thread sleeve into the axial step, a non-round circumferential contour of the radial collar of the thread element may be formed into a non-round inner circumferential contour of the axial step. Accordingly, a form-fit may arise between the thread element and the additively manufactured component. This form fit may serve for the mechanical load introduction from the thread element into the additively manufactured component, for example when a thread bolt is screwed into the thread sleeve.

An inner thread may be provided in the cylinder-like support section of the additively manufactured component.

According to a configuration of the present disclosure, the thread sleeve to be received in the additively manufactured component also includes an outer thread beside the inner thread. This outer thread may be screwed into an inner thread of the cylinder-like support section. The cylindrical support section may be provided without an inner thread. In both cases, the compression section of the thread sleeve which may be formed at the axial end side may be deformed into the widened molding section so as to fasten the thread sleeve in the additively manufactured component.

Furthermore, the present disclosure also includes a component bond consisting of an additively manufactured component according to one of the above configurations and a blind rivet nut or a blind rivet bolt, each being fastened in the receiving space, with a compression bead of the blind rivet nut or the blind rivet bolt extending into the widened molding section.

The present disclosure furthermore comprises a component bond consisting of an additively manufactured component according to one of the above configurations and a thread sleeve with a radially outer fastening thread and a radially inner standard thread, which is fastened in the receiving space, wherein a compression bead of the thread sleeve extends into the widened molding section. An end collar of the thread sleeve may be arranged in the axial step of the component and forms a form-fit connection with the component.

According to different designs of the present disclosure, a component bond is provided which consists of an additively manufactured component and a thread element that is fastened in a compressing manner having a thread that is true to gauge, which may be a standard thread. For this purpose, the thread element to be fastened in a compressing manner is arranged in the receiving space that is fungiform in its axial cross section and is fastened there by means of an axial compression with formation of a compression bead. These thread elements with a true-to-gauge inner thread include a blind rivet nut and a thread sleeve. A blind rivet bolt may be fastened in the additively manufactured component, so that the component bond arises, which consists of the additively manufactured component and the blind rivet bolt.

Furthermore, the present disclosure also includes a component bond out of an additively manufactured component out of metal or plastic material, having an inner receiving space that is open on at least one side at a component opening, the receiving space being accessible from a component side and being shaped cylinder-like in an axial cross section. On a side facing away from the component opening, the receiving space includes an expanding cone tapering in the direction of the component opening and being surrounded by a circumferential molding gap. A thread sleeve is anchored in the cylinder-like component opening with a one-sided rivet base, by radially expanding the rivet base into the circumferential molding gap.

The thread sleeve may have an inner standard thread and the rivet base may be configured as an expanding base.

Furthermore, the present disclosure includes a component bond out of the additively manufactured component and a thread sleeve with fastened expanding base. This expanding base is forced into a molding gap which encompasses an expanding cone within the additively manufactured component. In this way, a friction-fit and form-fit connection between the thread sleeve with expanding base and the additively manufactured component arises. Furthermore, the thread sleeve supports itself in the inner cylinder like receiving space with its cylindrical thread portion. Compared to the above-described alternatives of a component bond, the thread sleeve with expanding base also provides a true-to-gauge thread, such as a standard thread, within the additively manufactured component. Thus and in the same way as the above-mentioned component bonds, this component bond also forms a hybrid component consisting of an additively manufactured component out of plastic material or metal and a thread element with a true-to-gauge thread.

Furthermore, the present disclosure also includes an additive manufacturing method of a component according to one of the above-described configurations. The manufacturing method includes the following steps: providing a three-dimensional component drawing of the component, converting the three-dimensional component drawing into a layer model for the additive manufacturing of the component out of plastic material or metal and additive manufacturing of the three-dimensional component.

Furthermore, the present disclosure provides a manufacturing method of an additively manufactured component with a standard thread. The manufacturing method includes the following steps: providing an additively manufactured component according to one of the above-described configurations and at least one of the following connection elements: a blind rivet nut or a thread sleeve with an inner standard thread or a blind rivet bolt with an outer standard thread, plugging-in one of the connection elements through the component opening into the receiving space with the widened molding section, compressing the connection element in axial direction so that a compression bead of the connection element is formed and molded into the widened molding section.

According to a configuration of the manufacturing method, the blind rivet nut or the blind rivet bolt comprises a circumferential collar so that the blind rivet nut or the blind rivet bolt may be plugged through the component opening until the circumferential collar abuts a component surface of the component.

Furthermore, the present disclosure also includes the manufacturing method in combination with the additively manufactured component in which the axial step may be arranged between the component surface and the molding section. In this manufacturing method, a thread sleeve with an outer thread may be screwed into the receiving space and a compression section of the thread sleeve is axially compressed and molded into the widened molding section. According to an embodiment of the described manufacturing method, a circumferential collar of the thread sleeve, which may be arranged on the end side, may be pressed into the axial step.

BRIEF DESCRIPTION OF THE DRAWINGS

In the following, the present disclosure is described in detail with reference to the drawings. In the drawings, the same reference signs denote the same components and/or elements. They show.

DETAILED DESCRIPTION

The present disclosure provides a component that is manufactured with an additive manufacturing method, the component being equipped with a loadable and true-to-gauge thread, which may be a standard thread. Additive manufacturing methods use metal or plastic powder or granules in order to constrict the component in layers. The basis for that is a computer-generated three-dimensional model of the component which is converted into a layer model before the manufacturing. Such methods for different materials are known in the state of the art. Further embodiments of the additively manufactured components 10; 30; 50 are schematically shown in FIGS. 2, 4, 6, 7-10 and 12.

In order to equip the additively manufactured components 10; 30; 50 with a true-to-gauge inner thread 25, which may be a standard thread, a thread element 20; 22; 40; 60 is fastened in the respective additively manufactured component 10; 30; 50, as is shown in FIGS. 2, 4, 6, 12.

The connection of additively manufactured component 10; 30; 50 and the thread element 20; 22; 40; 60 forms a component bond A; B; C; D.

Figure 1:
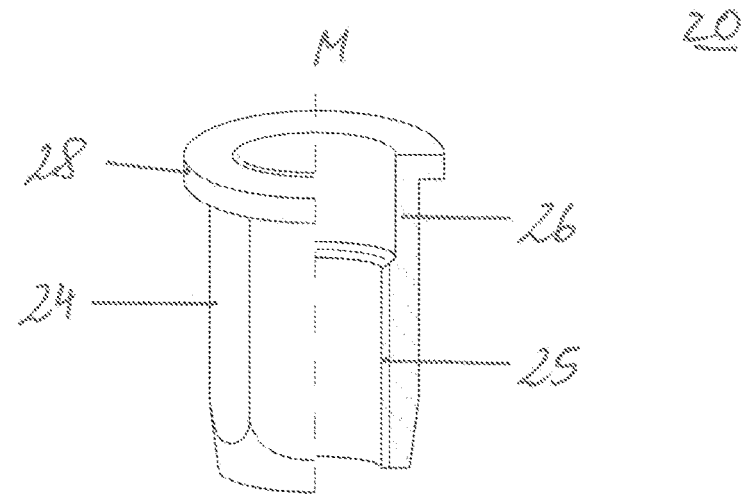
FIG. 1 an embodiment of a blind rivet nut in a partial sectional view.
Figure 2:
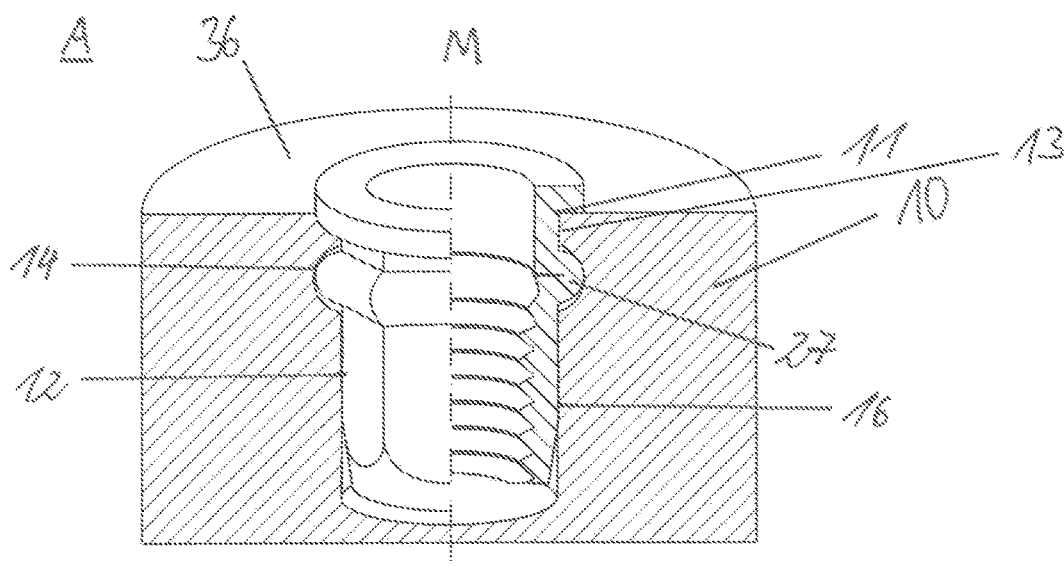
FIG. 2 an embodiment of an additively manufactured component with a blind rivet nut fastened in it, FIG. 3 a perspective view of an embodiment of a blind rivet bolt, FIG. 4 an embodiment of an additively manufactured component with a blind rivet bolt fastened in it, FIG. 5 a partial sectional view of an embodiment of a thread sleeve with compression section, FIG. 6 an embodiment of a component bond out of an additively manufactured component with a thread sleeve fastened in it having a compression portion, FIG. 7 a perspective partial sectional view of an embodiment of an additively manufactured component, FIG. 8 a partial sectional view of an enlarged section from an additively manufactured component, FIG. 9 a further enlarged section of a configuration of the additively manufactured component, FIG. 10 a perspective sectional view of a further configuration of the additively manufactured component, FIG. 11 an overview of configurations of a circumferential contour of the molding section and/or the support section, each in a schematic radial sectional view, FIG. 12 an embodiment of a component bond consisting of an additively manufactured component and a thread sleeve with rivet base in a sectional view, FIG. 13 a flow chart of an embodiment of an additive manufacturing method of a component, and FIG. 14 a flow chart of an embodiment of a manufacturing method of an additively manufactured component with a true-to-gauge thread, which may be a standard thread.

In the first component bond A, a blind rivet nut 20 (see FIG. 1) which is known in the state of the art is fastened in the additively manufactured component 10 of plastic material or metal. The blind rivet nut 20 comprises a hollow cylindrical like shaft 24 with an inner thread portion 25 and a compression portion 26. The compression portion 26 is arranged adjacent to a circumferential collar 28, which projects radially to the outside with respect to the compression portion 26.

The radial outer counter of the hollow cylindrical shaft 24 is configured round or angular or generally non-round. A non-round contour may have the advantage that a rotation inhibition of the blind rivet nut 20 may be supported in the component 10.

Figure 3:
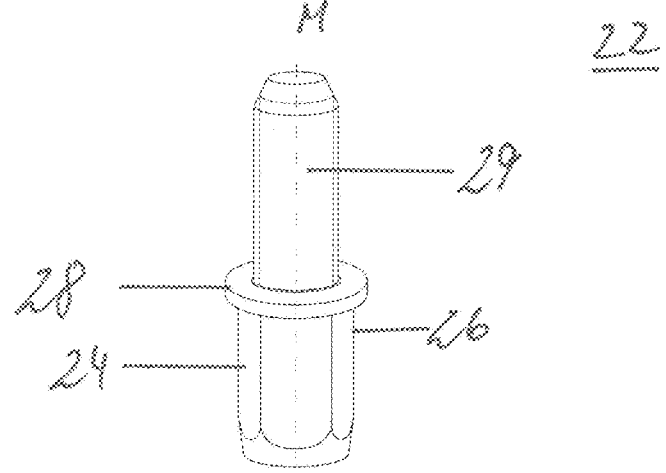
Figure 4:
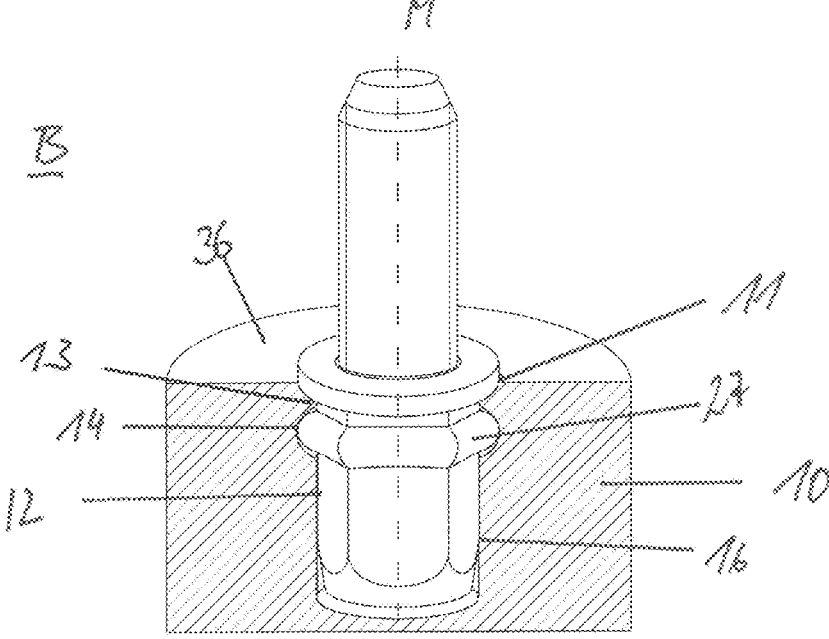

A known blind rivet bolt 22 is constructed in a similar way as the blind rivet nut 20 (see FIG. 3). The former also includes the hollow cylindrical like shaft 24 with the compression portion 26 and the extensively circumferential collar 28. A thread bolt 29 is fastened in the thread portion 25, which projects beyond the circumferential collar 28 and comprises an outer thread.

For receiving and fastening the blind rivet nut 20 and the blind rivet bolt 22, the component 10 includes an inner receiving space 12. The receiving space 12 is accessible from at least one side via a component opening 11. The blind rivet nut 20 or the blind rivet bolt 22 are plugged into the receiving space 12 through the component opening 11. The receiving space 12 may be provided with both sides being open in axial direction.

The receiving space 12 is divided into a widened molding section 14 facing the component opening 11. A cylinder like support section 16 is provided which faces away from the component opening 11. The receiving space 12 is configured fungiform in an axial cross-section due to its construction out of beadlike molding section 14 and cylinder like support section 16, as can be recognized in FIGS. 2, 4, 7-10. Accordingly, an inner diameter of the molding section 14 is configured lager than the support section 16.

Due to the differences in diameter between the molding section 14 and the support section 16, the forming of an undercut of the compression portion 26 in axial direction of the blind rivet nut 20 and the blind rivet bolt 22 may be supported. This undercut of the compression portion 26 may secure the blind rivet nut 20 or the blind rivet bolt 22 within the component 10.

In order to establish the component bond A; B, the component 10; 20; 30; 50 is first of all manufactured with the additive manufacturing method. The basis for the manufacturing is the provision of the component 10; 20; 30; 50 as a three-dimensional component drawing (step S1).

Subsequently, the three-dimensional component drawing is converted into a layer model in order to be able to additively manufacture the component 10; 20; 30; 50 out of plastic material or metal in layers in a computer-controlled manner on this basis (step S2).

As soon as the layer model of the component 10; 20; 30; 50 has been manufactured in a computer-based manner, the additive manufacturing of the component 10; 20; 30; 50 takes place (step S3).

As during the additive manufacturing of the components 10; 20; 30; 50, a thread that is true to gauge, which may be a standard thread, can only be manufactured with great effort or cannot be manufactured at all, the component 10; 20; 30; 50 may be connected with the thread element 20; 22; 40; 60 in a not detachable manner which may be after its additive manufacturing. The thread elements 20; 22; 40; 60 include a true-to-gauge thread 25, which may be a standard thread.

In order to allow a screw to be rotated into the thread 25 accurately, both the thread dimensions of the screw as well as those of the thread 25 must offer sufficient play for the screwing process. This play is guaranteed by the accuracy to gauge. The same applies analogously to the blind rivet bolt 22 with outer thread.

Once the additively manufactured component 10; 30; 50 and the thread element 20; 22; 40; 60 have been provided in step H1, the thread element 20; 22; 40; 60 is inserted into the receiving space 12 through the component opening 11 (step H2).

The blind rivet nut 20 and the blind rivet bolt 22 may be plugged into the receiving opening 12. According to a further configuration, the thread element is a thread sleeve 40 with an inner thread 25 and an outer thread 42. The thread sleeve 40 is screwed into the receiving space 12 via the outer thread 42 in manufacturing step H2.

By doing so, the compression section 26; 26' may be arranged adjacent to the widened molding section 14.

Subsequently, the thread element 20; 22; 40 is compressed parallel to its central longitudinal axis M within the receiving space 12 in the known manner (step H3). During the compression process, the shaft wall of the compression section 26; 26' is folded radially to the outside. By doing so, a compression bead 27; 27' is formed which is forced into the widened molding section 14.

A circumferential collar 13 which may project radially inwardly is arranged between the widened molding section 14 and the component opening 11. The collar 13 reduces a diameter of the component opening 11 compared with an inner diameter of the molding section 14. Based on this construction, the compression bead 27 may form an axial undercut in the molding section 12 in the direction of the component opening 11 as well as in the direction of the cylinder like support section 16. By that, the blind rivet nut 20, the blind rivet bolt 22 and the thread sleeve 40 may be axially held and fixed in the receiving space 12.

According to a configuration of the manufacturing method of the component bond, a thread bolt (not shown) may be screwed into the inner thread 25 of the blind rivet nut 20, the blind rivet bolt 22 and the thread sleeve 40 in order to compress the blind rivet nut 20, the blind rivet bolt 22 and the thread sleeve 40. The shaft 24 with screwed-in thread bolt is pulled in the direction of the collar 28, 28' against an axial retention force at the collar 28 of the blind rivet nut 20 or the blind rivet bolt 22 or at the collar 28' of the thread sleeve 40. Due to the acting axial pulling force, the compression portion 26; 26' folds radially outwardly in the compression bead 27 and into the widened molding section 14.

Figure 7:
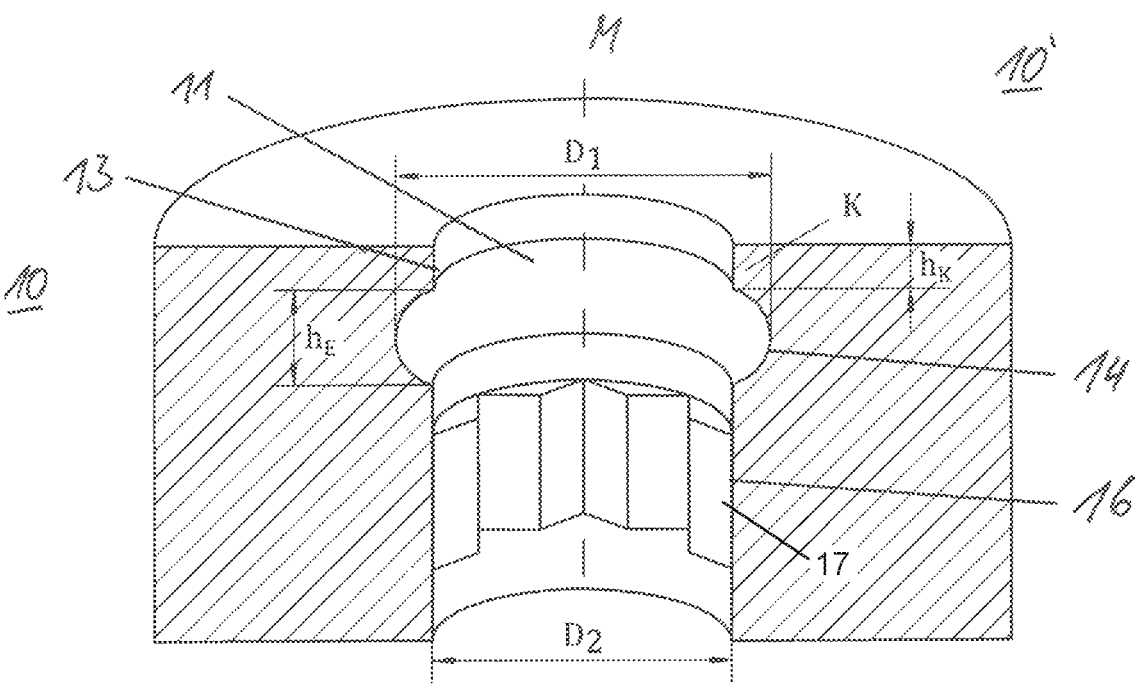

With respect to FIG. 7, the circumferential retaining collar 13 has, at the component opening 11, an axial extension $h_K$ parallel to the central longitudinal axis M. The axial extension $h_K$ of the collar 13 may guarantee a constructive basis for a press fit of the blind rivet nut 20 and the blind rivet bolt 22 at the collar 13, because the collar 28 and the compression bead 27 may support themselves at opposite sides of the retaining collar 30, which may be against one another. This implements a support of the retention of the blind rivet nut 20 and the blind rivet bolt 22 in the receiving space 12.

The retaining collar 13 may have an axial thickness $h_K$ in the range from 0.5 mm≤≤5 mm.

For receiving the compression bead 27, the molding section 14 may have an axial height $h_E$ in the range from 0.5 mm≤$h_E$≤10 mm, and in some embodiments from 0.5 mm≤$h_E$≤5 mm. In order to achieve an axial clamping of the compression bead 27 in the molding section 14, the height $h_E$ of the molding section 14 may be adapted to an axial thickness of the compression bead 27 to be expected. This has the stabilizing effect that additionally, the axial sides of the compression bead 27 may be supported at the inside of the molding section 14, after the compression bead 27 has been forced into the molding section 14 during the compression process.

According to a further embodiment, the molding section 14 may have a maximum inner diameter $D_1$. The cylinder like support section 16 may have a maximum inner diameter $D_2$. The inner diameter $D_1$ of the molding section is configured larger than the inner diameter $D_2$ of the cylinder like support section 16. This may apply to the additively manufactured components 10 for receiving the blind rivet nut 20 and the blind rivet bolt 22 as well as to the component 30 for receiving the thread sleeve 40 with compression portion 26' (see FIGS. 7, 8, 9, 10). This adaptation of the inner diameters $D_1$, $D_2$ may support the formation of an undercut of the compression bead 27 within the receiving space 12 and thus the retention of the thread element 20; 22; 40 in the additively manufactured component 10; 30.

The inner diameters $D_1$, $D_2$ of the molding section 14 and the support section 16 fulfil the following relation:

$$0.6 \leq D_2/D_1 \leq 0.95.$$

According to a further embodiment, the molding section 14 and/or the cylinder like support section 16 have a non-round inner contour 15/17. The non-round inner contour 15, 17 may include each shape which is capable of entering into a rotation-inhibitive positive engagement with an also non-round outer contour of the compression bead 27 and/or a non-round outer contour of the shaft 24. For this purpose, it may be sufficient when at least a partial surface of the compression bead abuts the inner side of the molding section 14 or a partial portion of the outer side of the shaft 24 abuts the inner side of the support section 16 in a form-fit manner.

In a radial cross section viewed through the molding section 14 and the support section 16 and the shaft 24, the following rotation-inhibitive contours for the shaft 24, the molding section 14 and the support section 16 are preferred: all n-angular shapes with n≥3, star-like shapes, rounded shapes of the above-mentioned, cross shapes, rectangular shapes, drop shapes, lens shapes, elliptical shape.

Figure 11:
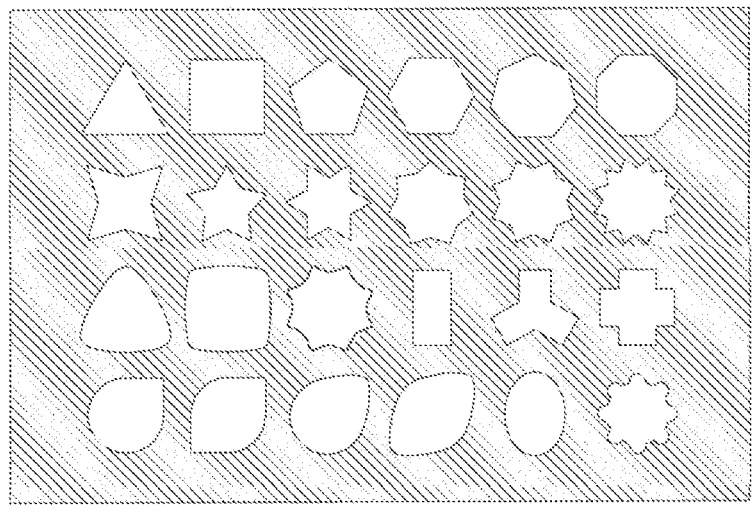

The above-mentioned shapes or contours, respectively, are schematically shown in a top view in FIG. 11 for example.

Figure 8:
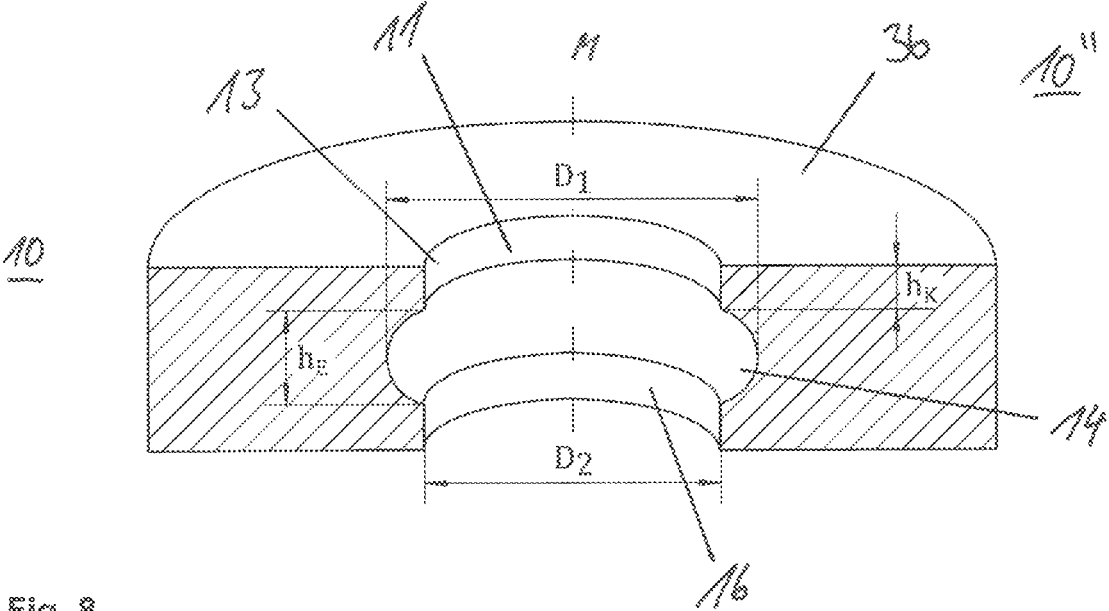
Figure 9:
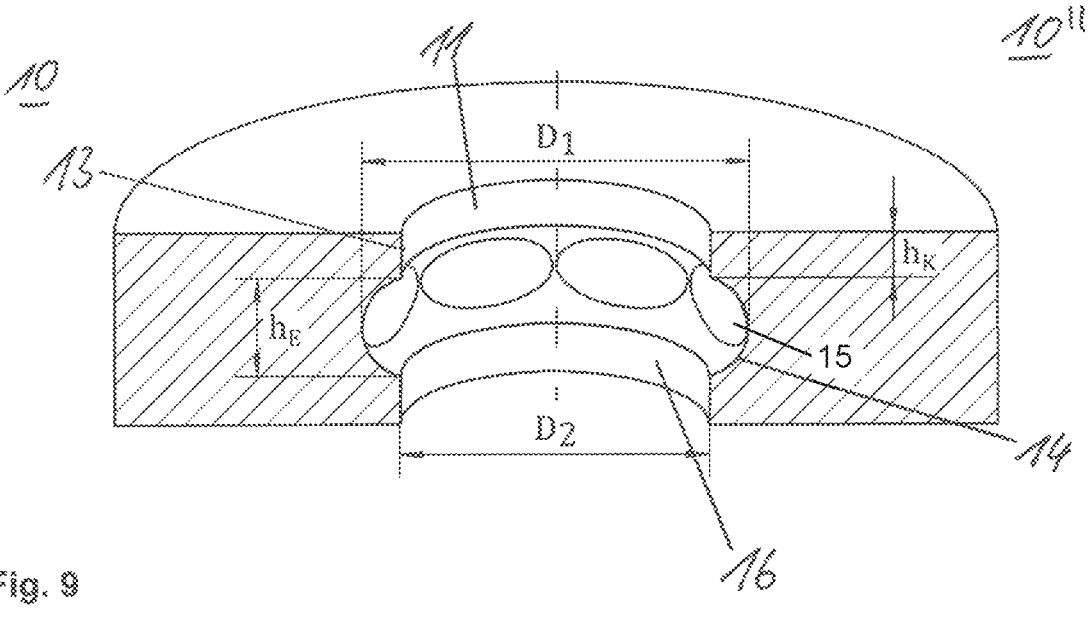
Figure 10:
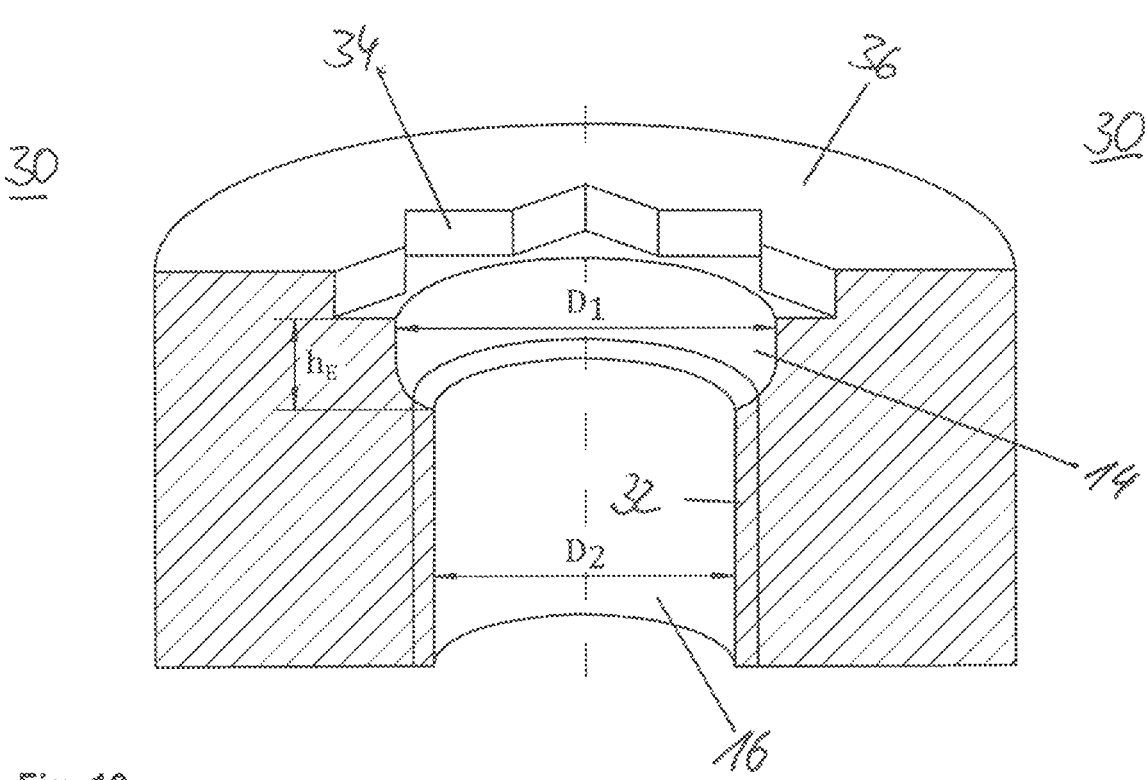

Furthermore, the non-round shape of the molding section 14 and of the support section 16 can also be described by a diameter variation of the inner diameter $D_1$ and $D_2$, because with an imagined rotation of the diameter $D_1$ and $D_2$ about the central longitudinal axis M, the same changes its length due to the rotation-inhibitive contour of the molding section 14 and of the support section 16 (also see FIGS. 7-9).

Figure 5:
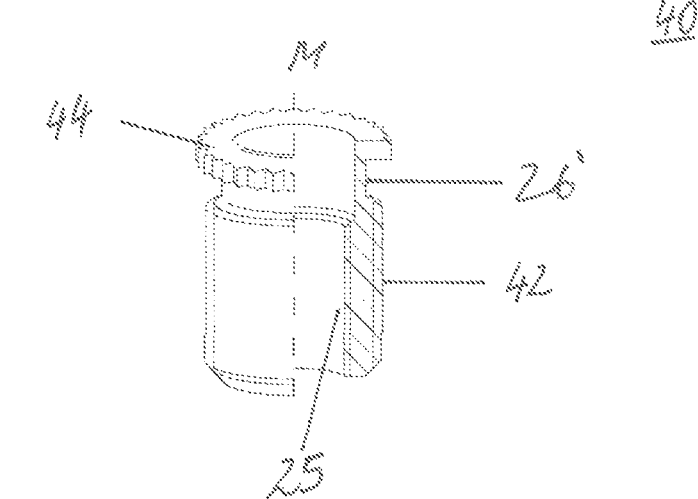
Figure 6:
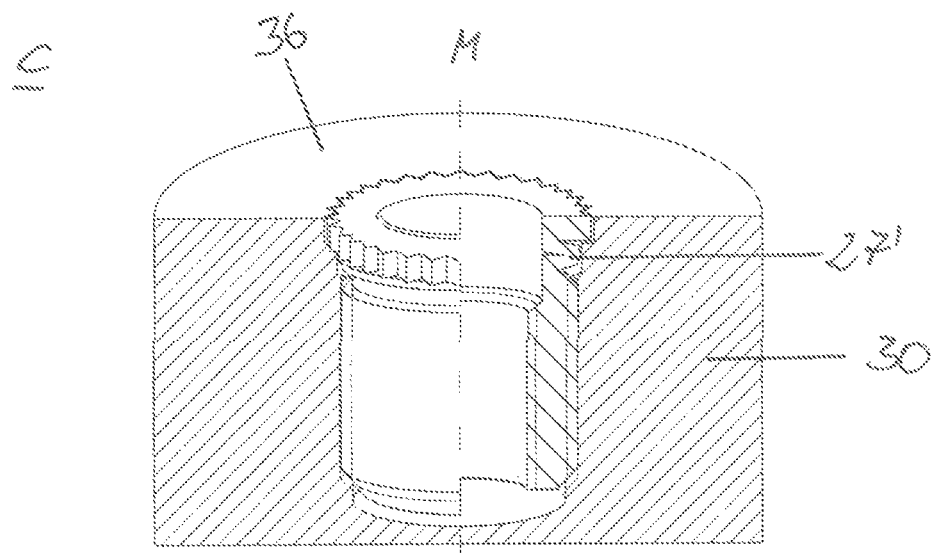

According to a further embodiment of the component bond C, the thread sleeve 40 may be fastened according to FIG. 5 in the component 30. Apart from the inner thread 25, the outer thread 23 and the compression bead 26, the thread sleeve 40 has a circumferential fastening collar 44 that is arranged at the end side. The outer thread 42 may engage an inner thread 32 of the support section 16.

In order to be able to fasten the fastening collar 44 against rotation in the component 30, the same has a non-round outer contour. This outer contour is constructed similarly as has been described with respect to the inner contour of the molding section 14 and the support section 16 (see FIGS. 7, 9).

In order to make a flush arrangement of the thread sleeve 40 with the component surface in the component bond C (see FIG. 6), an axial step 34 is provided adjacent the molding section 14. The axial step 14 constitutes a steplike connection between the outer component surface 36 and the molding section 14. Compared to the component 10, the axial step 34 increases the component opening 11 by the collar 13 radially returning into the component.

For holding the thread sleeve 40 via the rotation collar 44 against rotation, the axial step 34 has a non-round contour which may be in circumferential direction. It may also be formed polygon-like, wave-like, curvilinear or in another shape, as has been described above with respect to the non-round inner contour of the molding section 14 and the support section 16.

During the fastening of the thread sleeve 40 in the component 30, the compression portion 26' is folded into the molding section 14. Furthermore, the fastening collar 44 may be forced or pressed into the axial step 34.

Figure 12:
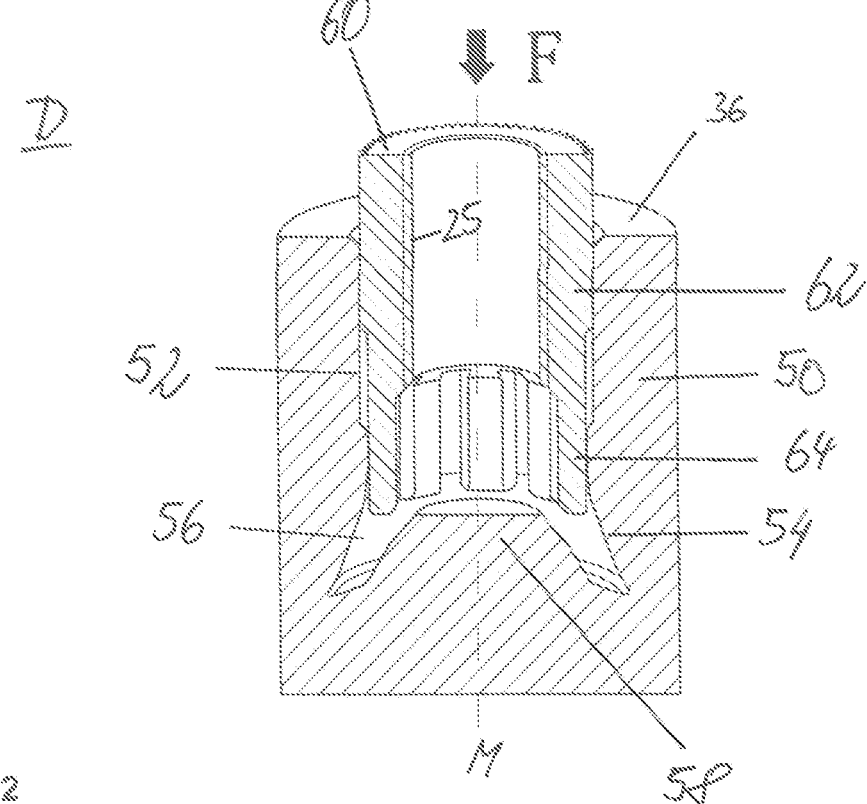

A further embodiment of the component bond D is shown in FIG. 12. The component bond D may consist of an additively manufactured component 50 with a cylindrical receiving space 52 starting at a component opening 51.

The cylindrical section 52 transitions into a truncated cone-like molding section 54 at the closed end of the receiving space 52. The truncated cone-like molding section 54 consists of a receiving gap 56 which surrounds a truncated cone-like mandrel 58. The truncated cone-like mandrel 58 protrudes in the direction of the component opening 51 and tapers in the direction of the component opening 51.

The cylindrical section 52 in combination with the truncated cone-like molding section 56 is adapted to a thread element 60 which consists of a hollow cylindrical thread sleeve 62 with a rivet base 64.

By means of a setting force F, the thread element 60 is pressed into the cylindrical section 52 (see FIG. 12). There, the rivet base 64 encounters the truncated cone-like mandrel 58 and is radially widened. At the same time the rivet base 64 is pressed into the receiving gap 56.

A non-round outer contour of the thread sleeve 62 may lead to the rotation inhibition of the thread element 60 in the component 50.

The invention claimed is:

1. An additively manufactured component made of metal or plastic material, comprising:
  a) an inner receiving space that is open on at least one side at a component opening, wherein
  b) the inner receiving space is accessible from a component side, wherein
  c) the inner receiving space includes
    c1) a widened molding section facing the component opening and
    c2) a cylinder shaped support section facing away from the component opening, wherein an inner diameter of the widened molding section is larger than an inner diameter of the cylinder shaped support section, and wherein
  d1) an axial step of the component is arranged between a surface of the component and the widened molding section and the cylinder shaped support section comprises an inner thread, or
  d2) the widened molding section comprises a circumferential inner wall which is circumferentially structured by a diameter variation of the widened molding section such that the inner diameter of the widened molding section is varied in terms of its size with a rotation of 360° within a plane perpendicular to a central axis of the widened molding section and a thread element is fixedly retainable against a rotation about a longitudinal axis thereof in the additively manufactured component by a rotation-inhibitive form fit that is achieved by radial steps, angular or web protrusions at a radial inner side of the widened molding section, or by projecting blocking webs or blocking knobs, or
  d3) the cylinder shaped support section includes a circumferential inner wall which is circumferentially structured by a diameter variation of the cylinder shaped support section and the widened molding section comprises a circumferential inner wall which is circumferentially structured by a diameter variation of the widened molding section such that the inner diameter of the support section is varied in terms of its size with a rotation of 360° within a plane perpendicular to a central axis of the support section, the inner diameter of the widened molding section is varied in terms of its size with a rotation of 360° within a plane perpendicular to a central axis of the widened molding section and a thread element is fixedly retainable against a rotation about a longitudinal axis thereof in the additively manufactured component by a rotation-inhibitive form fit that is achieved by radial steps, angular or web protrusions at a radial inner side of the cylinder shaped support section and the widened molding section, or by projecting blocking webs or blocking knobs.

2. The additively manufactured component according to claim 1, wherein the inner diameter $D_1$ of widened molding section has a relation to the inner diameter $D_2$ of the cylinder shaped support section according to $0.6 \leq D_2/D_1 \leq 0.95$.

3. The additively manufactured component according to claim 1, wherein the widened molding section has an axial extension $h_E$ in a range $0.5$ mm$\leq h_E \leq 10$ mm.

4. The additively manufactured component according to claim 1, alternatives d2) or d3), wherein a circumferential retaining collar which projects radially inwardly is arranged between the component opening and the widened molding section, the collar serving as an axial clamping portion with an axial thickness $h_K$ in a range from $0.5$ mm$\leq h_K \leq 5$ mm.

5. A component bond consisting of an additively manufactured component according to claim 1, alternatives d2) or d3), and a blind rivet nut or a blind rivet bolt, wherein the blind rivet nut or the blind rivet bolt is fastened in the inner receiving space and a compression bead of the blind rivet nut or of the blind rivet bolt extends into the widened molding section.

6. A component bond consisting of an additively manufactured component according to claim 1, alternative d1), and a thread sleeve with a radially outer fastening thread and a radially inner true-to-gauge thread, the thread sleeve being fastened in the inner receiving space, wherein a compression bead of the thread sleeve extends into the widened molding section.

7. The component bond according to claim 6, wherein an end collar of the thread sleeve is arranged in the axial step of the component and forms a form-fit connection with the component.

* * * * *